United States Patent Office 2,864,839
Patented Dec. 16, 1958

2,864,839

$\Delta^{4,7,9(11)}$-PREGNATRIENE-17$\alpha$,21-DIOL-3,20-DIONE AND PROCESS THEREFOR Josef Fried, Princeton, N. J., assignor to Olin Mathieson Chemical Corporation, New York, N. Y., a corporation of Virginia No Drawing. Application July 25, 1958
Serial No. 750,867

5 Claims. (Cl. 260—397.45)

This application is a continuation-in-part of my application, Serial No. 417,489, filed March 10, 1954, now Patent No. 2,852,511, granted September 16, 1958.

This invention relates to and has as its object the provision of new physiologically active steroids of the general formula

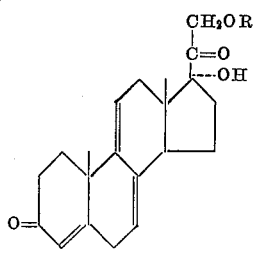

wherein R is hydrogen or a lower fatty acid acyl radical.

The steroids of this invention are prepared by interacting $\Delta^{4,9(11)}$-pregnadiene-17$\alpha$,21-diol-3,20-dione or a 21-lower fatty acid ester thereof, with N-bromoacetamide in the presence of sulfuric acid. The reaction results in the preparation of $\Delta^{4,7,9(11)}$-pregnatriene-17$\alpha$,21-diol-3,20-dione, which can then be acylated in the usual manner, as by treatment with a lower fatty acid anhydride in the presene of an organic base, such as pyridine, to yield a 21-ester derivative.

The steroids of this invention are physiologically active compounds which possess mineralocorticoid activity and hence can be used in lieu of known mineralocorticoids, such as desoxycorticosterone acetate in the treatment of Addison's disease, for which purpose they are administered in an aqueous suspension in the same manner as desoxycorticosterone acetate, for example, with the dosage and/or concentration adjusted for the potency of the particular steroid.

The following examples illustrate the invention (all temperatures being in centigrade):

EXAMPLE 1

$\Delta^{4,7,9(11)}$-*Pregnatriene-17$\alpha$,21-diol-3,20-dione*

3.0 g. of finely pulverized $\Delta^{4,9(11)}$-pregnadiene-17$\alpha$,21-diol-3,20-dione 21-acetate is dissolved in 300 ml. of hot pure dioxane. After adding 30 ml. of water, the solution is rapidly cooled to room temperature, while agitating. Under these conditions, the $\Delta^{4,9(11)}$-pregnadiene-17$\alpha$,21-diol-3,20-dione 21-acetate precipitates in the form of micro-crystals. To the resulting suspension is added 1.34 g. of N-bromoacetamide and 30 ml. of 1 N aqueous sulfuric acid, and the mixture is gently agitated from time to time until it has become completely clear. After a total reaction period of one hour, dilute sodium sulfite solution is added until the yellow solution has been almost completely decolorized. 750 ml. of chloroform is then added, and the small aqueous phase floating on top is separated off. The chloroform-dioxane phase containing 9$\alpha$-bromohydrocortisone 21-acetate is washed with dilute sodium bicarbonate and with water and dried over sodium sulfate. Removal of the solvents in vacuo leaves an amorphous residue which is dissolved in 30 ml. of acetone. Crystallization ensues rapidly and furnishes about 1.80 g. of 9$\alpha$-bromohydrocortisone 21-acetate. The aqueous phase is allowed to stand in the refrigerator for 40 days whereupon crystals are deposited. These crystals are extracted into chloroform and the chloroform extract is washed with sodium bicarbonate solution and water and dried over sodium sulfate. Evaporation of the solvent leaves a crystalline residue (about 231 mg.) consisting of $\Delta^{4,7,9(11)}$-pregnatriene-17$\alpha$,21-diol-3,20-dione, which after recrystallization from acetone has the following properties: M. P. about 219–221°;

$$[\alpha]_D^{23} + 233°$$

(c., 0.99 in chloroform);

$$\lambda_{max.}^{alc.} \ 243 \ m\mu$$

($\epsilon$=18,000), shoulders at 237 m$\mu$ ($\epsilon$=16,600) and 250 m$\mu$ ($\epsilon$=14,700);

$$\lambda_{max.}^{Nujol} \ 3.05\mu, \ 5.77\mu, \ 5.87\mu, \ 6.00\mu$$

*Analysis.*—[Calculated for $C_{21}H_{26}O_4$ (342.42): C, 73.66; H, 7.66. Found (approximately): C, 73.75; H, 7.61].

EXAMPLE 2

$\Delta^{4,7,9(11)}$-*Pregnatriene-17$\alpha$,21-diol-3,20-dione 21-acetate*

A solution of 10.3 mg. of $\Delta^{4,7,9(11)}$-pregnatriene-17$\alpha$,21-diol-3,20-dione in 1 ml. of pyridine and 1 ml. of acetic anhydride is allowed to stand at room temperature for 15 hours. The resulting mixture is evaporated to dryness in high vacuum, and the residue crystallized from acetone. The acetate has the following properties: M. P. about 200–202°;

$$\lambda_{max.}^{alc.} \ 243 \ m\mu$$

($\epsilon$=21,900), shoulders at 237 m$\mu$ ($\epsilon$=20,300) and 250 m$\mu$ ($\epsilon$=18,000);

$$\lambda_{max.}^{Nujol} \ 3.02\mu, \ 5.77\mu, \ 5.81\mu, \ 5.88\mu, \ 6.06\mu$$

Similarly, by substituting other lower fatty acid anhydrides, such as propionic anhydride and enanthic anhydride, for the acetic anhydride in Example 2, the corresponding 21-ester derivatives are obtained.

The invention may be otherwise variously embodied within the scope of the appended claims.

What is claimed is:
1. A steroid of the general formula

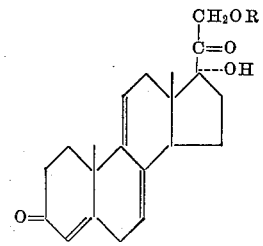

wherein R is selected from the group consisting of hydrogen and a lower fatty acid acyl radical.

2. $\Delta^{4,7,9(11)}$-Pregnatriene-17$\alpha$,21-diol-3,20-dione.
3. $\Delta^{4,7,9(11)}$-Pregnatriene-17$\alpha$,21-diol-3,20-dione 21-acetate.
4. A process of preparing $\Delta^{4,7,9(11)}$-pregnatriene-17$\alpha$,21-diol-3,20-dione, which comprises interacting a steroid selected from the group consisting of $\Delta^{4,9(11)}$-pregnadiene-17$\alpha$,21-diol-3,20-dione and 21-lower fatty acid esters thereof with N-bromoacetamide in the presence of sulfuric acid and recovering the $\Delta^{4,7,9(11)}$-pregnatriene-17$\alpha$,21-diol-3,20-dione formed.
5. The process of claim 4 wherein the steroid reactant is $\Delta^{4,9(11)}$-pregnadiene-17$\alpha$,21-diol-3,20-dione 21-acetate.

No references cited.